United States Patent
Wang et al.

(10) Patent No.: US 9,577,509 B2
(45) Date of Patent: Feb. 21, 2017

(54) EMULATED PEAK CURRENT LIMIT SCHEME FOR SWITCHING REGULATOR

(71) Applicant: Analog Devices Global, Hamilton (BM)

(72) Inventors: Basa Wang, Shanghai (CN); Zhijie Zhu, Shanghai (CN)

(73) Assignee: Analog Devices Global, Hamilton (BM)

( * ) Notice: Subject to any disclaimer, the term of this patent is extended or adjusted under 35 U.S.C. 154(b) by 149 days.

(21) Appl. No.: 14/260,690

(22) Filed: Apr. 24, 2014

(65) Prior Publication Data

US 2015/0280544 A1   Oct. 1, 2015

Related U.S. Application Data

(63) Continuation of application No. PCT/CN2014/074148, filed on Mar. 27, 2014.

(51) Int. Cl.
   *H02M 1/32*   (2007.01)
   *H02M 3/156*   (2006.01)
   *H02M 1/00*   (2006.01)

(52) U.S. Cl.
   CPC ............. *H02M 1/32* (2013.01); *H02M 3/156* (2013.01); *H02M 2001/0009* (2013.01)

(58) Field of Classification Search
   CPC ...... H02M 3/156; H02M 3/157; H02M 3/158; H02M 3/155; H02M 3/1584; H02M 3/1588; H02M 2001/0009
   See application file for complete search history.

(56) References Cited

U.S. PATENT DOCUMENTS

| | | | | |
|---|---|---|---|---|
| 4,672,518 A | * | 6/1987 | Murdock | H02M 3/33546 323/285 |
| 7,432,694 B2 | * | 10/2008 | Brenden | H02M 3/156 323/222 |
| 7,936,540 B2 | | 5/2011 | Isham | |
| 2007/0007938 A1 | | 1/2007 | Djenguerian et al. | |
| 2011/0169472 A1 | | 7/2011 | Isham | |
| 2012/0062044 A1 | * | 3/2012 | Wagoner | H02J 3/38 307/151 |
| 2014/0146581 A1 | * | 5/2014 | Tsou | H02M 3/33507 363/21.18 |

* cited by examiner

*Primary Examiner* — Jeffrey Gblende
(74) *Attorney, Agent, or Firm* — Schwegman Lundberg & Woessner, P.A.

(57) ABSTRACT

An apparatus comprises a switching circuit, an error amplifier circuit, a current threshold circuit, and an over-current detection circuit. The switching circuit provides a switching duty cycle that includes a charge portion and a discharge portion. The error amplifier circuit generates an error signal representative of a difference between a target voltage value and a voltage at an output of the voltage regulator circuit. The switching circuit adjusts the switching duty cycle to regulate the voltage at the output using the error signal and a reference waveform signal. The current threshold circuit generates an adaptive peak current limit threshold. The over-current detection circuit generates an over-current signal when the reference waveform signal satisfies the adaptive peak current limit threshold during the charging portion of the switching cycle. The switching circuit interrupts one or more switching cycles when the reference waveform signal satisfies the adaptive peak current limit threshold.

20 Claims, 5 Drawing Sheets

FIG. 5

EMULATED PEAK CURRENT LIMIT SCHEME FOR SWITCHING REGULATOR

CLAIM OF PRIORITY

This application is a continuation under 35 U.S.C. §111(a) and claims benefit of priority to International Patent Application Serial No. PCT/CN2014/074148, filed Mar. 27, 2014, which is hereby incorporated by reference herein in its entirety.

BACKGROUND

Switching regulators are useful for voltage conversion applications such as direct current to direct current (DC-DC) voltage conversion or alternating current to DC (AC-DC) voltage conversion. The DC-DC voltage conversion can provide a regulated voltage that is higher than the input voltage of the regulator, lower than the input voltage, or inverted from the input voltage. The regulation is typically achieved by recurrently charging an inductor from an energy source and then discharging the energy of the inductor to drive a load. The charging and discharging can be accomplished using electronic switches that include transistors. The switches and other electronics of the switches may be damaged if an over current condition or an over voltage condition occurs. The present inventor has recognized a need for improvement of monitoring of switching regulators.

OVERVIEW

This document relates generally to switching power converters and methods of their operation. An apparatus example includes a switching circuit, an error amplifier circuit, a current threshold circuit, and an over-current detection circuit. The switching circuit provides a switching duty cycle that includes a charge portion and a discharge portion. The error amplifier circuit generates an error signal representative of a difference between a target voltage value and a voltage at an output of the voltage regulator circuit. The switching circuit adjusts the switching duty cycle to regulate the voltage at the output using the error signal and a reference waveform signal. The current threshold circuit generates an adaptive peak current limit threshold. The over-current detection circuit generates an over-current signal when the reference waveform signal satisfies the adaptive peak current limit threshold during the charging portion of the switching cycle. The switching circuit interrupts the charging portion of one or more switching cycles when the reference waveform signal satisfies the adaptive peak current limit threshold.

This section is intended to provide an overview of subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Electronic systems can include power circuits such as voltage regulators that are useful to provide a fixed or stable voltage. Switching voltage regulator circuits can provide a regulated output voltage using electronic switches or transistors that are turned either on or off. In some applications the potential may exist for currents to develop in the regulators that exceed the capabilities of the electronic switches. A circuit fuse may not react fast enough to protect the switches so an overcurrent condition can be detected by comparing current against a current limit. However, it may not be straightforward for some switching regulators to monitor the desired current and handle an over current event.

Figure 1:
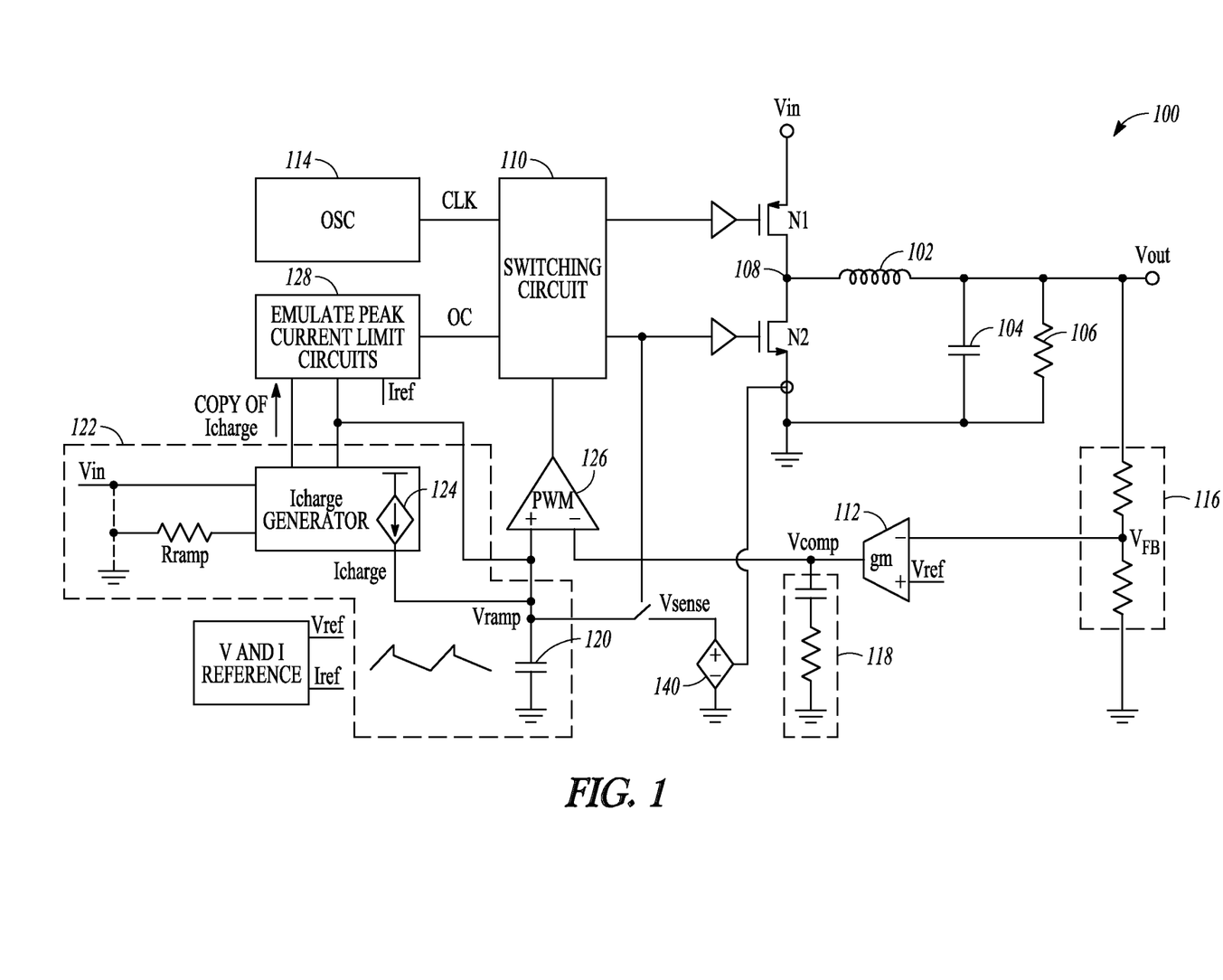
FIG. 1 shows a schematic of an example of a voltage regulator circuit.

FIG. 1 shows a schematic of an example of a voltage regulator circuit 100. The circuit includes a high-side transistor N1, a low-side transistor N2, and an inductor 102. The circuit can include an output capacitor 104 electrically coupled to an output port and can supply an output voltage Vout to an output load 106. The inductor 102 can be coupled between the output capacitor 106 and a circuit node 108. The low-side transistor N2 can be electrically coupled between the circuit node 108 and circuit ground, and the high-side transistor N1 can be electrically coupled between the circuit node 108 and an input port that is electrically coupled to an input voltage Vin.

The voltage regulator circuit 100 includes a switching circuit 110. The switching circuit 110 receives a clock signal from an oscillator 114 and the switching circuit 110 is configured (e.g., by circuit logic) to use the clock signal to provide a switching duty cycle that includes a charge portion and a discharge portion. The voltage regulator circuit 100 receives electrical energy during the charge portion of the switching duty cycle.

During the charge portions of successive cycles, the high-side transistor N1 is turned on or active to raise the voltage of the circuit node 108 almost to the input voltage VIN at the input voltage port. This initial activation drives a current through the inductor 102 and to the output capacitor 104 and load 105. During the discharge portion of the switching duty cycles, the low-side transistor N2 is turned on to pull the circuit node 108 almost to circuit ground. This second activation provides a gradually declining current from the energy stored in the inductor 102 to the output capacitor 104 and load 105.

The duration of the charge portion of the switching duty cycle can be automatically adjusted to maintain the output voltage Vout at a specified level. The adjustment can be accomplished using a voltage circuit feedback circuit or feedback loop that includes an error amplifier circuit 112. The error amplifier circuit 112 generates an error signal (Vcomp) representative of a difference between a target voltage value and the voltage Vout at the output of the voltage regulator circuit 100. The feedback loop can include a resistive divider 116 to provide a scaled representation of the output voltage to the error amplifier circuit 112 instead of the actual output voltage as a feedback voltage. The error amplifier circuit 112 compares the feedback voltage with a voltage reference (Vref) to generate the error signal. The voltage regulator circuit 100 may include a filter 118 for filtering the generated error signal.

The switching circuit 110 adjusts the switching duty cycle to regulate the voltage at the output using the error signal and a reference waveform signal. The reference waveform signal can be a substantially sawtooth waveform signal Vramp. In the example shown in the Figure, the reference waveform Vramp is generated using a reference waveform circuit 122. The reference waveform circuit 122 can include a current source 124 electrically coupled to a capacitor 120 to recurrently charge the capacitor with current Icharge to generate an increasing voltage ramp signal for part of the sawtooth reference signal. In the example of a current source circuit shown in the Figure, the current source 124 provides a current of Icharge=K*VIN/Rramp, where K is a constant. The current source 124 is shown using Vin and Rramp to create Icharge, but a different voltage source than Vin may be used to generate Icharge, or Rramp can be electrically coupled to circuit ground to generate Icharge. The voltage regulator circuit 100 can be fabricated on an integrated circuit (IC). Rramp can be a resistor incorporated into the IC or Rramp can be an external resistor.

The discharge current through the inductor 102 can be sensed (e.g., by sensing amplifier 140) and used to generate a voltage signal (Vsense) representative of inductor current at the low-side transistor N2 during the discharge portion of the switching duty cycle. The generated voltage signal is used to provide the decreasing voltage ramp portion of the sawtooth reference signal. The reference waveform circuit 122 incorporates the increasing voltage ramp signal and the decreasing voltage ramp signal into the substantially sawtooth reference waveform signal.

According to some examples, the error signal is compared to the reference waveform signal as part of pulse width modulation (PWM) control that regulates the output voltage Vout. The voltage regulator circuit 100 can include a comparator circuit 126 to generate a PWM signal provided to the switching circuit 110. The PWM signal can be a digital signal that indicates when the error signal is less than or equal to the reference waveform signal. Alternatively, the digital signal may indicate when the error signal is greater than the reference waveform signal. The switching circuit 110 can include logic circuits to implement PWM switching control. The switching circuit 110 uses the period of the clock signal from the oscillator 114 and the PWM signal from the comparator circuit 126 to set the durations of the charge portion and discharge portion of the switching duty cycle according to the feedback loop. For example, the switching circuit 110 may turn on the high-side transistor N1 for a duration based on the comparison of the error signal and the reference waveform signal and then activate the low-side transistor N2 for the remainder of each period of the clock signal.

Activation of the high-side transistor generates a gradually increasing current in the inductor and activation of the low-side transistor generates a gradually decreasing current in the inductor during each switching duty cycle. The increasing and then decreasing current maintains the feedback voltage at a value substantially equal to the reference voltage Vref. The switching circuit 110 may implement a maximum on time for the high-side transistor N2 to ensure that the high-side transistor is off for at least a portion of each clock period. This activation sequence maintains the output voltage VOUT at the output port at the desired level regardless of the current demand at the load 106.

In the example shown in FIG. 1, the circuit topology and the target voltage value generates a regulated voltage for Vout that is less than the voltage at the input Vin of the voltage regulator circuit (e.g., a buck converter circuit). Other examples can include, among other things, voltage regulator circuit topologies to generate a regulated Vout that is greater than Vin (e.g., a boost converter circuit), circuit topologies to generate a regulated Vout that can be either greater or less than Vin (e.g., a boost/boost converter circuit), and circuit topologies to generate an inverted value of Vin as the output voltage Vout.

As explained previously herein, a component failure in a voltage regulator could produce over currents that may damage switches of the voltage regulator or produce over currents that result in damage to circuit components downstream from the voltage regulator.

Figure 2:
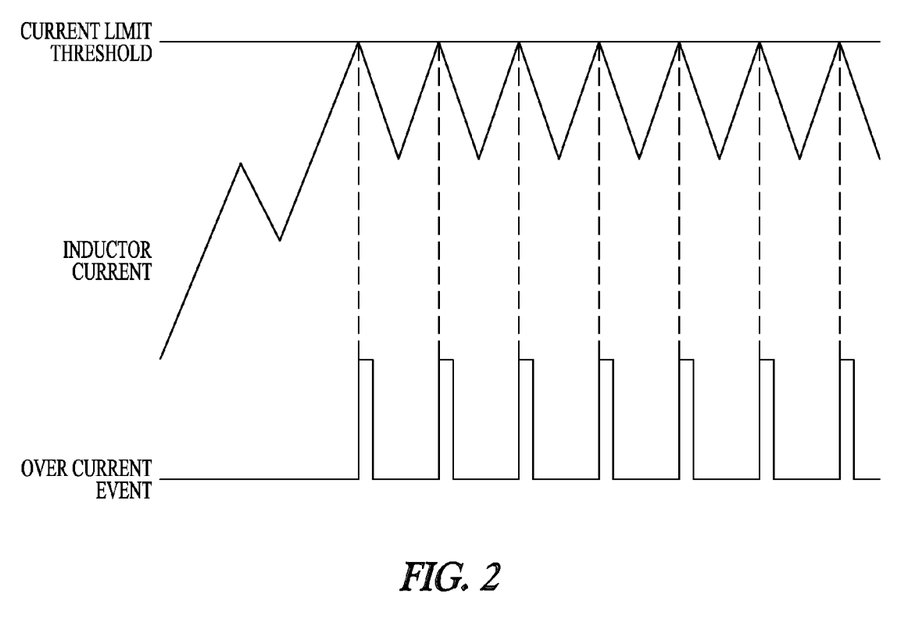
FIG. 2 illustrates a representation of an example of a current waveform in an inductor of a voltage regulator circuit.

FIG. 2 illustrates a representation of an example of a current waveform 205 in an inductor of a voltage regulator circuit. To protect the electronic devices from an over current condition, the inductor current is compared to current limit threshold. When the inductor current reaches the threshold an over current event 210 is indicated. The voltage regulator may then modify its operation to avoid damage. However for some voltage regulator circuit or system designs, the desired current limit may vary with the implementation of the voltage regulator.

Figure 3:
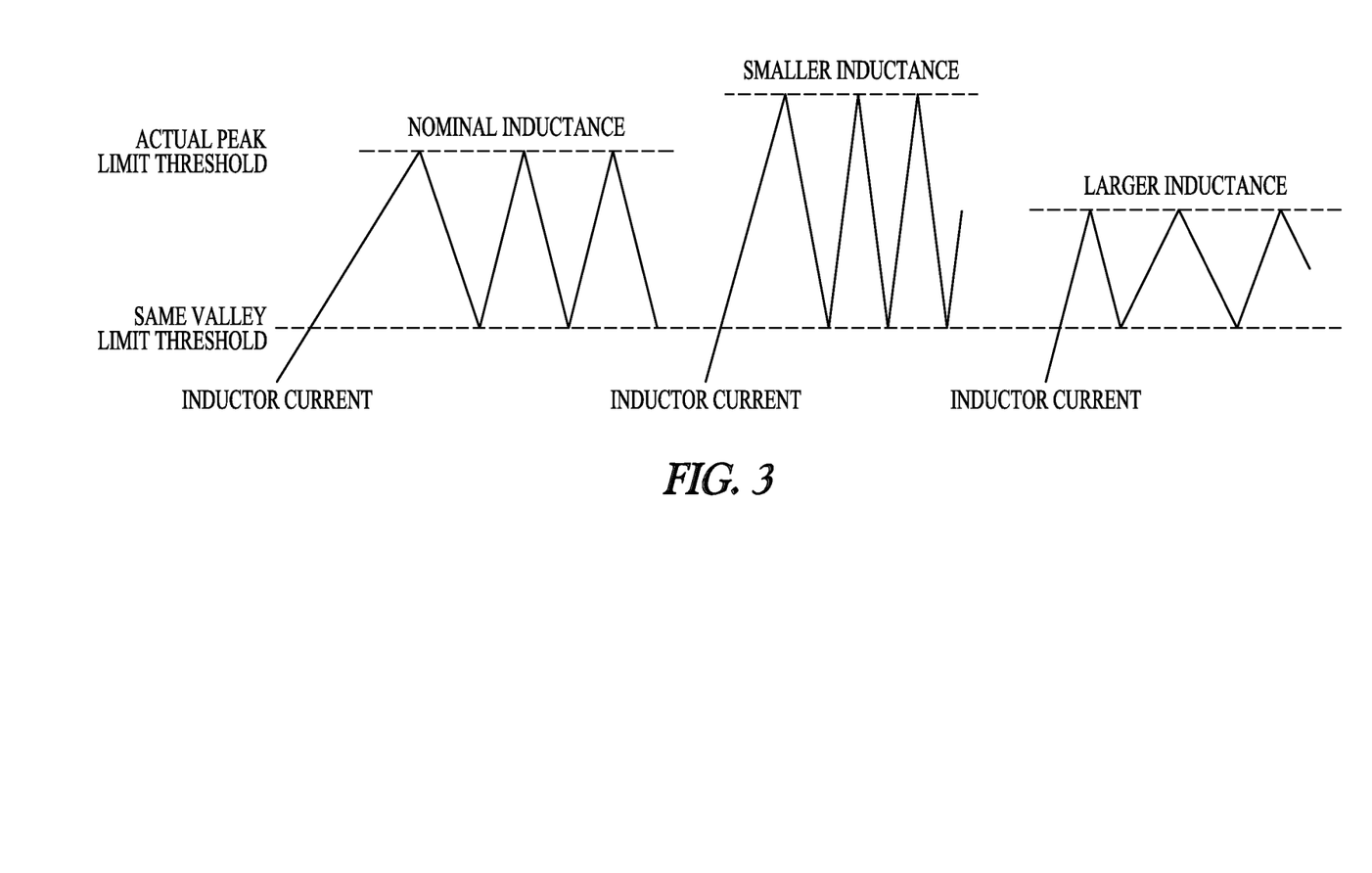
FIG. 3 illustrates additional examples of inductor circuit waveforms for different values of inductance.

FIG. 3 illustrates three examples of inductor current waveforms for different values of inductance. The waveforms in the Figure show that three different values of a peak current limit threshold may be desirable for three different values of inductance. It is to be noted in the Figure however, that the valley current does not vary in the same way as the current peak. The valley current can be used as a threshold limit that accommodates difference in inductance. However, using only the valley current limits the over current control to the bottom portion of the ramp down portion of the inductor charging. It is preferred to use the peak of the ramp up portion of the charging cycle for easier and more accurate detection of a current limit on a cycle-by-cycle basis. Over current detection can be improved by emulating the ramp up portion of the inductor current. This emulated current waveform can be incorporated into an adaptive peak current limit threshold that can be used to detect the current limit on a cycle-by-cycle basis.

Returning to FIG. 1, this current emulation can be provided by the current threshold circuit 128 of FIG. 1 that generates an adaptive peak current limit threshold. The voltage regulator includes an over-current detection circuit (not shown in the Figure) that generates an over-current signal (OC) when the reference waveform signal satisfies the adaptive peak current limit threshold during the charging portion of the switching cycle. The switching circuit 110 interrupts the charge portion of one or more switching cycles when the reference waveform signal satisfies the adaptive peak current limit threshold.

Figure 4:
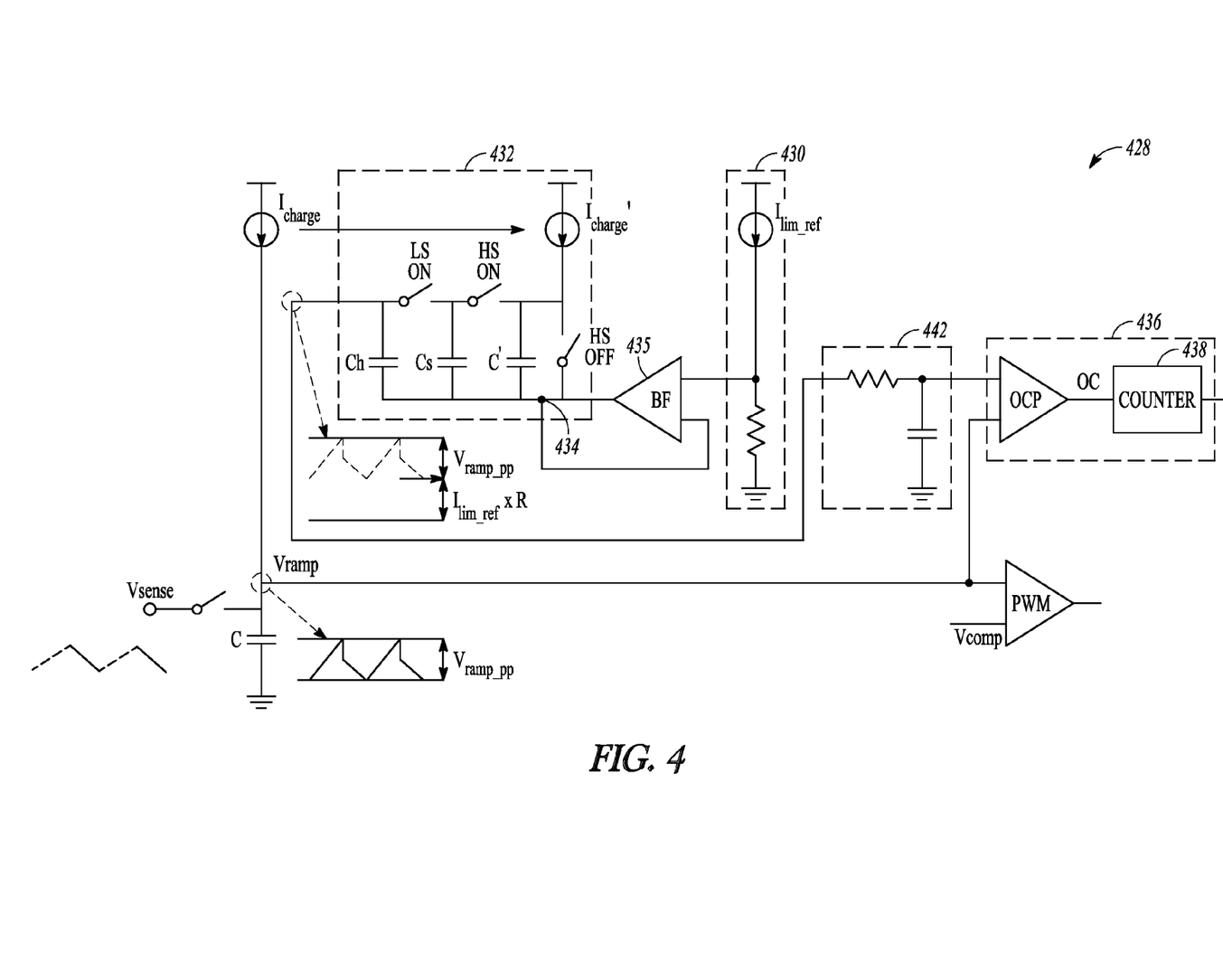
FIG. 4 shows a schematic of an example of a circuit to generate an adaptive peak current limit threshold.

FIG. 4 shows an example of a current threshold circuit 428 that generates an adaptive peak current limit threshold. The current threshold circuit 428 includes a reference circuit 430 and a sample and hold circuit 432. The reference circuit 430 provides a voltage value to correspond to a valley current limit threshold. The sample and hold circuit 432 generates a voltage value to correspond to a peak-to-peak value of the reference waveform signal (e.g., Vramp). The current threshold circuit 428 also includes a summing circuit node 434 to sum the peak-to-peak value of the reference waveform signal and the valley current limit threshold voltage value as the adaptive peak current limit threshold. A buffer circuit 435 can be included to provide isolation between the reference circuit 430 and the sample and hold circuit 432.

In the example shown in the FIG. 4, the current threshold circuit 428 regenerates the increasing voltage ramp signal generated by the reference waveform circuit 122. To do this, the example in FIG. 4 includes a current mirror circuit that mirrors the current Icharge of the current source of the reference waveform circuit. The mirrored current Icharge' is provided to a capacitor C' to replicate the increasing voltage ramp signal. The mirrored current and capacitor C' may have the same values Icharge and C of the reference waveform circuit (e.g., 1:1), or may be sized (e.g., ratios of the current and capacitance values) to replicate the ramp signal.

In the example shown in FIG. 4, the sample and hold circuit 432 includes a capacitor Cs to sample the regenerated increasing voltage ramp signal and a capacitor Ch to hold the voltage value of the peak of the regenerated increasing voltage ramp signal. The sample and circuit 432 also includes a switch electrically coupled to Cs that is turned on when high-side switch N1 is turned on to sample the voltage value of the increasing ramp. The switch is turned off when N1 is off. The sample and circuit 432 further includes a switch electrically coupled between Cs and Ch that is on when low-side switch N2 is turned on and off when N2 is off. The voltage on Cs is transferred to Ch when N1 is off and N2 is on, and the voltage is held on Ch when N2 is off. The voltage value of the peak of the regenerated increasing voltage ramp signal and the valley current limit threshold voltage value can be summed at summing circuit node 434 to provide the adaptive peak current limit threshold.

FIG. 4 also shows an over-current detection circuit 436 that receives the generated adaptive peak current limit threshold and the generated reference waveform signal. In some examples, the current threshold circuit includes a filter circuit 442 configured to filter the generated adaptive peak current limit threshold. The over-current detection circuit 436 compares the filtered adaptive peak current limit threshold to the reference waveform signal.

As explained previously herein, the reference waveform circuit 122 of FIG. 1 incorporates the increasing voltage ramp signal from the current source and the decreasing voltage ramp signal from the current during discharge into the substantially sawtooth reference waveform signal. The over-current detection circuit 436 of FIG. 4 generates an over-current signal (OC) when the reference waveform signal satisfies the adaptive peak current limit threshold during the charging portion of the switching cycle. The adaptive peak current limit threshold is satisfied when the generated substantially sawtooth reference waveform signal exceeds the valley current value summed with the emulated current of the inductor. The over-current signal can be provided to the switching circuit 110 of FIG. 1. In some examples, the switching circuit 110 is configured to hold the high-transistor inactive and the low side transistor active when the reference waveform signal satisfies the adaptive peak current limit threshold. The hold or interrupt may be released on the next switching cycle.

By holding the high-transistor inactive, the charge portion of a switching cycle is interrupted and the switching cycle consists or substantially consists of the discharge portion. If the over current event is detected over a specified number N of switching periods, the switching circuit may stop switching for a specified time duration and then start up again. The specified number N may be different for different applications of the voltage regulator circuit 100 of FIG. 1. In some examples, the over-current detection circuit 436 may hold the high-transistor inactive for a time duration that is not a multiple of switching cycles. For example, the time duration can be obtained by using a constant current to charge a capacitor from zero volts (0V) to a specified voltage. The voltage regulator circuit 100 may restart the charge portions when the specified voltage is reached.

The over-current detection circuit 436 of FIG. 4 may not generate the OC signal immediately after initial detection. In some examples, the over-current detection circuit 436 includes a counter circuit 438 that changes count when the reference waveform signal satisfies the adaptive peak current limit threshold during the charging portion of the switching cycle. The over-current detection circuit 436 may generate the over-current signal when the counter circuit 438 reaches a specified count value or when the specified count is exceeded. When the switching cycles are interrupted by the generated OC signal, the counter circuit 438 may be reset to detect the next over-current event.

Figure 5:
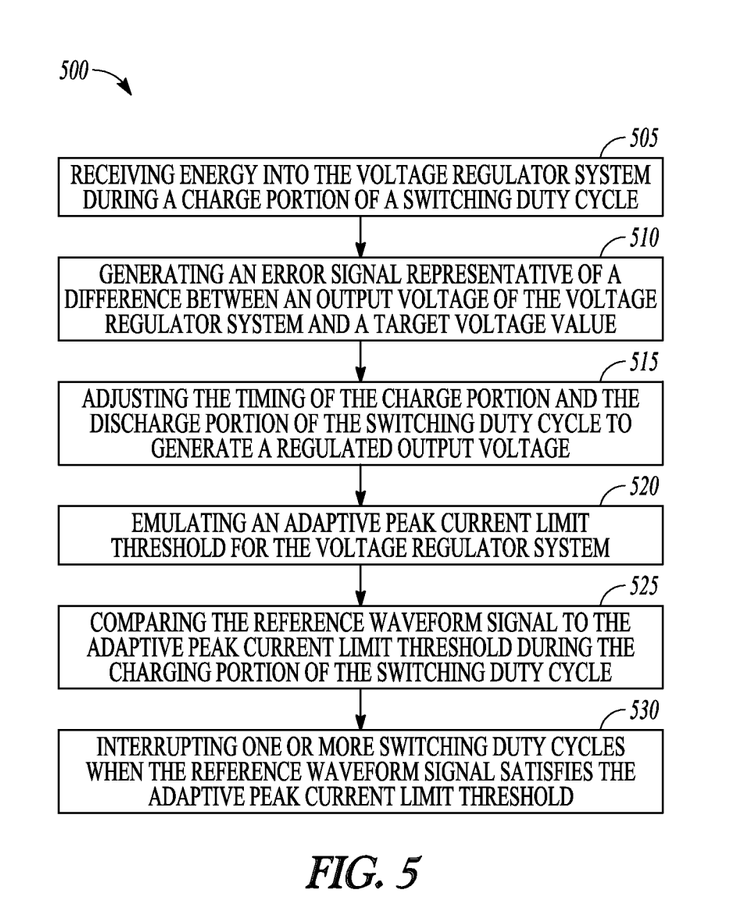
FIG. 5 shows an example of a method 500 of operating a voltage regulator system.

FIG. 5 shows an example of a method 500 of operating a voltage regulator system. The method includes at 505 receiving energy into the voltage regulator system during a charge portion of a switching duty cycle. As explained previously herein, the switching duty cycle can include a charge portion and a discharge portion. At 510, an error signal is generated that is representative of a difference between an output voltage of the voltage regulator system and a target voltage value. At 515, the timing of the charge portion and the discharge portion of the switching cycle is adjusted using a comparison of the error signal and a reference waveform signal to generate a regulated output voltage.

At 520, an adaptive peak current limit threshold is emulated for the voltage regulator system. The emulated current threshold can be formed by combining a generated increasing voltage ramp signal and a generating decreasing voltage ramp signal sensed from the current during discharge into the substantially sawtooth reference waveform signal. At 525, the reference waveform signal is compared to the adaptive peak current limit threshold during the charging portion of the switching duty cycle.

At 530, one or more switching duty cycles are interrupted when the reference waveform signal satisfies the adaptive peak current limit threshold. This may indicate an over-current condition. The switching can be interrupted to halt the charging portions of one or more switching duty cycles. The operation of the voltage regulator system may be halted by the over-current detection or temporarily interrupted (e.g., a specified number of cycles or specified time duration).

The operation of the voltage regulator system allows for a cycle-by-cycle monitoring of the upper or peak current limit of the voltage regulation. Monitoring the peak current limit on a cycle-by-cycle basis provides for accurate peak current mode control of the voltage regulator.

ADDITIONAL NOTES

The above detailed description includes references to the accompanying drawings, which form a part of the detailed description. The drawings show, by way of illustration, specific embodiments in which the invention can be practiced. These embodiments are also referred to herein as "examples." All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects. Method examples described herein can be machine or computer-implemented at least in part.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. §1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the invention should be determined with reference to the appended claims, along with the full scope of equivalents to which such claims are entitled.

What is claimed is:

1. A voltage regulator circuit comprising:
   a switching circuit configured to provide a switching duty cycle that includes a charge portion and a discharge portion for charging and discharging an inductor;
   an error amplifier circuit configured to generate an error signal representative of a difference between a target voltage value and a voltage at an output of the voltage regulator circuit, wherein the switching circuit is configured to adjust the switching duty cycle to regulate the voltage at the output using the error signal and a reference waveform signal;
   a current threshold circuit configured to emulate inductor current using a valley current limit threshold voltage value and a peak-to-peak voltage value of the reference waveform signal and generate an adaptive peak current limit threshold using the emulated current; and
   an over-current detection circuit configured to generate an over-current signal when the reference waveform signal satisfies the adaptive peak current limit threshold during the charging portion of the switching cycle, and wherein the switching circuit is configured to interrupt the charge portion of one or more switching cycles when the reference waveform signal satisfies the adaptive peak current limit threshold.

2. The voltage regulator circuit of claim 1,
   wherein the reference waveform circuit includes a current source electrically coupled to a first capacitor to recurrently charge the first capacitor to generate an increasing voltage ramp signal,
   wherein the current threshold circuit includes a second capacitor and a current mirror circuit configured to mirror current of the current source of the reference waveform circuit and to regenerate the increasing voltage ramp signal of the reference waveform circuit, and
   wherein the summing circuit node is configured to sum the voltage value of the peak of the regenerated increasing voltage ramp signal and the valley current limit threshold voltage value as the adaptive peak current limit threshold.

3. The voltage regulator circuit of claim 1, wherein the current threshold circuit includes a filter circuit configured to filter the generated adaptive peak current limit threshold, and wherein the over-current protection circuit is configured to compare the filtered adaptive peak current limit threshold to the reference waveform signal.

4. The voltage regulator circuit of claim 1, including:
   an inductor electrically coupled to the switching circuit;
   a reference waveform circuit; and
   a current sensing circuit electrically coupled to the switching circuit and the reference waveform circuit,
   wherein the switching circuit includes a high-side switch circuit and a low-side switch circuit, and wherein the switching circuit is configured to charge the inductor by activation of the high-side switch during the charge portions of the switching duty cycle, discharge the inductor by activation of the low side switch during the discharge portion of the switching duty cycle,
   wherein the current sensing circuit is configured to generate a voltage signal representative of inductor current at the low side switch circuit during the discharge portion of the switching cycle, and
   wherein the reference waveform circuit is configured to incorporate the generated voltage signal representative of the sensed inductor current into the reference waveform signal.

5. The voltage regulator circuit of claim 1, including:
   an inductor electrically coupled to the switching circuit,
   wherein the current sensing circuit is configured to generate a decreasing voltage ramp signal representative of inductor current during the discharge portion of the switching duty cycle,
   wherein a reference waveform circuit includes a current source electrically coupled to a capacitor to recurrently charge the capacitor to generate an increasing voltage ramp signal, and wherein the reference waveform circuit is configured to incorporate the increasing voltage ramp signal and the decreasing voltage ramp signal into a substantially sawtooth reference waveform signal.

6. The voltage regulator circuit of claim 1, wherein the switching circuit includes one or more logic circuits to implement pulse width modulation switching (PWM) and wherein the target voltage value is less than a voltage at an input of the voltage regulator circuit.

7. The voltage regulator circuit of claim 1, wherein the current threshold circuit includes:
   a reference circuit configured to provide the valley current limit threshold voltage value;

a sample and hold circuit configured to generate the voltage value corresponding to a peak-to-peak value of the reference waveform signal; and a summoning circuit node to sun the peak-to-peak value of the reference waveform signal and the valley current limit threshold voltage value as the adaptive peak current limit threshold.

8. A voltage regulating system comprising:

a switching circuit configured to provide PWM regulation using a switching duty cycle that includes a charge portion and a discharge portion for charging and discharging an inductor;

a feedback circuit configured to generate an error signal representative of a difference between a target voltage value and a voltage at an output of the voltage regulating system, wherein the switching circuit is configured to modulate the switching duty cycle using a comparison of the error signal and a reference waveform signal;

a current threshold circuit configured to emulate inductor current using a valley current limit threshold voltage value and a peak-to-peak voltage value of the reference waveform signal and generate an adaptive peak current limit threshold using the emulated current; and an over-current detection circuit configured to generate an over-current signal when the reference waveform signal satisfies the adaptive peak current limit threshold, and wherein the switching circuit is configured to interrupt one or more switching duty cycles when the reference waveform signal satisfies the adaptive peak current limit threshold.

9. The voltage regulating system of claim 8, wherein the current threshold circuit includes:

a reference circuit configured to provide the valley circuit limit threshold voltage value;

a sample and hold circuit configured to generate the voltage value corresponding to a peak-to-peak value of the reference waveform signal; and a summing circuit node to sum the peak-to-peak value of the reference waveform signal and the valley current limit threshold voltage value as the adaptive peak current limit threshold.

10. The voltage regulating system of claim 9, wherein the reference waveform circuit includes a current source electrically coupled to a first capacitor to recurrently charge the first capacitor to generate an increasing voltage ramp signal, wherein the current threshold circuit includes a second capacitor and a current mirror circuit configured to mirror current of the current source of the reference waveform circuit and to regenerate the increasing voltage ramp signal of the reference waveform circuit, wherein the summing circuit node is configured to sum the voltage value of the peak of the regenerated increasing voltage ramp signal and the valley current limit threshold voltage value as the adaptive peak current limit threshold.

11. The voltage regulating system of claim 10, wherein the sample and hold circuit includes a third capacitor configured to sample the regenerated increasing voltage ramp signal and fourth capacitor to hold the voltage value of the peak of the regenerated increasing voltage ramp signal.

12. The voltage regulating system of claim 9, including a filter circuit configured to filter a signal that is the sum the peak-to-peak value of the reference waveform signal and the valley current limit threshold voltage value, and to provide the filtered signal to the over-current protection circuit.

13. The voltage regulating system of claim 9, wherein the switching circuit is configured to produce a regulated voltage at the output of the voltage regulator circuit that is less than the voltage at the input of the voltage regulator circuit.

14. The voltage regulating system of claim 9, wherein the over-current protection circuit includes a counter circuit configured to change count when the reference waveform signal satisfies the adaptive peak current limit threshold during the charging portion of the switching cycle, wherein the over-current detection circuit generates the over-current signal when the counter circuit reaches a specified count value.

15. The voltage regulating system of claim 9, including a high side transistor and a low side transistor, wherein the switching circuit is configured to initiate charging of the inductor by activation of the high-side transistor during the charge portion of the switching cycle, and initiate discharging of the inductor by activation of the low side transistor during the discharge portion of the switching cycle, wherein the over-current protection circuit is configured to hold the high-transistor inactive and the low side transistor active when the reference waveform signal satisfies the adaptive peak current limit threshold.

16. A method of operating a voltage regulator system, the method comprising:

receiving energy into the voltage regulator system during a charge portion of a switching duty cycle, wherein the switching duty cycle includes the charge portion and a discharge portion;

generating an error signal representative of a difference between an output voltage of the voltage regulator system and a target voltage value;

adjusting the timing of the charge portion and the discharge portion of the switching duty cycle using a comparison of the error signal and a reference waveform signal to generate a regulated output voltage;

emulating current in an inductor using a valley current limit threshold voltage value and a peak-to-peak voltage value of the reference waveform signal;

generating an adaptive peak current limit threshold for the voltage regulator system using the emulated inductor current;

comparing the reference waveform signal to the adaptive peak current limit threshold during the charging portion of the switching duty cycle; and interrupting one or more switching duty cycles when the reference waveform signal satisfies the adaptive peak current limit threshold.

17. The method of claim 14, wherein emulating an adaptive peak current limit threshold includes generating a valley current limit threshold and adding the reference waveform signal to the valley current limit threshold.

18. The method of claim 14, including:

charging an inductor of the voltage regulator system during the charge portion of the switching cycle;

discharging the inductor during the discharge portion of the switching duty cycle;

sensing inductor current during the discharge portion of the switching duty cycle; and incorporating a voltage signal representative of the sensed inductor current into the reference waveform signal.

19. The method of claim 14, wherein receiving energy into the voltage regulator system includes receiving energy having an input voltage that is greater than an output voltage generated using the voltage regulator system.

20. The method of claim 16, wherein generating the adaptive peak current limit threshold for the voltage regulator system includes generating a time varying peak current limit threshold signal, filtering the generated peak current limit threshold signal, and wherein the comparing includes comparing the reference waveform signal to the filtered peak current limit threshold signal.

* * * * *